United States Patent
Helbig et al.

(10) Patent No.: US 6,181,709 B1
(45) Date of Patent: Jan. 30, 2001

(54) METHOD AND APPARATUS FOR THE ENLARGEMENT OF THE RANGE OF THE TRANSMISSION CHANNEL BETWEEN FUNCTIONAL GROUPS OF THE ISDN-USER INTERFACE WITH A MINIMIZED BANDWIDTH

(75) Inventors: Klaus Helbig, Berlin; Norbert Wulst, Bischofswerda, both of (DE)

(73) Assignee: DICA Technologies AG (DE)

( * ) Notice: Under 35 U.S.C. 154(b), the term of this patent shall be extended for 0 days.

(21) Appl. No.: 08/898,277

(22) Filed: Jul. 22, 1997

(30) Foreign Application Priority Data

Sep. 11, 1996 (DE) ............................................. 196 37 302

(51) Int. Cl.⁷ ................................. H04J 3/16; H04J 3/12

(52) U.S. Cl. ........................................... 370/467; 370/524

(58) Field of Search .................................. 370/465, 468, 370/419, 420, 522, 524, 467

(56) References Cited

U.S. PATENT DOCUMENTS

| | | | |
|---|---|---|---|
| 4,797,654 | 1/1989 | Young et al. | 370/467 |
| 5,148,430 | 9/1992 | Kuranaga et al. | 370/276 |
| 5,412,660 | 5/1995 | Chen et al. | 370/318 |
| 5,436,895 | 7/1995 | Matsumoto | 370/391 |
| 5,506,845 | 4/1996 | Kamishima | 370/465 |
| 5,673,258 | 9/1997 | Helbig et al. | 370/293 |

FOREIGN PATENT DOCUMENTS

| | | |
|---|---|---|
| 30 28 155 C2 | 2/1982 | (DE) . |
| 3431 423 A1 | 3/1986 | (DE) . |
| 39 15043 A1 | 11/1990 | (DE) . |
| 41 41 725 A1 | 6/1993 | (DE) . |
| 2 249 927 | 5/1992 | (GB) . |

OTHER PUBLICATIONS

Bell Laboratories Technical Journal, Dec. 1984, pp. 2283–2331.
M.M. Luniewicz et al. The SLC 96 Subscriber Loop Carrier System: Channel Bank.
Siemens Components, Apr. 1987 Munchen DE, pp. 65–69, B. Muller Communications Devices Cope with Digital Transmission, see Figs. 2, 4, 5.
International Conference on Communications, Including Supercomm Technical Sessions Atlanta, Apr. 15–19, 1990; Apr. 15, 1990 Institute of Electrical and Electronics Engineers, pp. 1637–1642 XP 000146059 Tzung–Pao Lin Residential ISDN Services: Information Service Architecture.
ICC '84 Links For the Future, May 14, 1984 Amsterdam, NL, A Termote et al. ISDN Field Trial in the Belgian Network see p. 880–p. 881; Figs. 3–6.

*Primary Examiner*—Chau Nguyen
*Assistant Examiner*—Soon–Dong Hyun
(74) *Attorney, Agent, or Firm*—Robert W. Becker & Associates

(57) ABSTRACT

A process and device in which (a) data transmission is done so that coded data specific to ISDN is converted into binary code on both a network side and a receiver side using a code converter, (b) the entering data of B channels being prepared in segments of equal length for B1 and B2 channel data in a memory unit and subsequently fed to a transmission device and sent to the receiver side. The data leaving a storage device are checked for consistency and compressed; (c) blocks are checked out of entering data of the D channel blocks and fed into the transmission device for transmission to the receiver side; (d) the ISDN-specific clock pulses are regained out of the temporal sequence of the transferred data bits on the receiver side or net side, respectively, by meant of clock pulse recovery elements; and (e) the received data bits are analyzed. Detected D channel blocks are disassembled and fed directly into a code converter, and detected B channel data is decompressed and the binary-coded data converted into coded data specific to ISDN.

11 Claims, 4 Drawing Sheets

METHOD AND APPARATUS FOR THE ENLARGEMENT OF THE RANGE OF THE TRANSMISSION CHANNEL BETWEEN FUNCTIONAL GROUPS OF THE ISDN-USER INTERFACE WITH A MINIMIZED BANDWIDTH

FIELD OF THE INVENTION

The invention relates to a method and apparatus for the enlargement of the range of the transmission channel between functional groups of the ISDN-user interface with reference to an ISDN interface as it is standardized, for example, according to CCITT I.400—ISDN User Network Interface and I.430—Basic User Network Interface. This invention enables the varied ISDN services to be transmitted over long distances with a minimized bandwidth.

BACKGROUND AND OBJECTS OF THE INVENTION

The ISDN (Integrated Services Digital Network), which allows, in addition to speech transmission, the rapid transmission of data, texts, and pictures also enables NT and TE apparatus as well as other distribution nets to be connected at its interfaces. Irrespective of a net-side interconnection of ISDN terminal equipment (TE) or network terminations (NT), the enlargement of the range of the transmission channel between functional groups of the ISDN-user interface with reference to an ISDN interface is of advantage for the transmission of the information of the net over a longer distance. However, the range achievable with traditional means is significantly limited due to the electrical features of the ISDN interfaces and connection ways.

From DE 44 07 214 C1, a technical solution is known which in spite of the restrictions of the physical state existing at the interface of an ISDN-user interface, allows to enlarge the range of the transmission channel between functional groups of the ISDN-user interface. In this solution, the ISDN-specific coded data incoming or, respectively, being required at the ISDN interfaces are converted into binary-coded data on the net (or network; as used herein, net refers to network) side as well as on the terminal side. The binary-coded data are grouped into blocks and directed to a transmission means to be corresponded on the net- or terminal-side, respectively. Due to the standardized structure of, for example, an ISDN basic terminal with 2×64 kbit/s of the B-channels or 1×16 kbit/s of the D-channel and the necessary signaling and control information the transmission means transmits, according to DE 44 07 214 C1, information with a bandwidth of 160 kbit/s, which is a considerable and expensive bandwidth of the data transmission via, for example, a satellite channel. Data transmission, particularly via satellite channels, considerably demands reduced bandwidths or, respectively, exactly defined bandwidths of, for example, 64 or 128 kbit/s. A number of satellite services run terminals with 64 kbit/s channels.

Therefore, it is the object of the invention to create a method and apparatus which allow the range of the transmission channel between functional groups of the ISDN-user interface in relation to an ISDN interface to be extended under the condition of a minimized bandwidth. This is achieved maintaining all ISDN-specific features, such as maintenance of the network timing multiple access to the interface bus activation and deactivation of the interface.

SUMMARY OF THE INVENTION

According to the invention, the problem of the enlargement of the range of the transmission channel between functional groups of the ISDN-user interface in relation to an ISDN interface with a minimized bandwidth is solved by a method in which a) the data transmission on the net side is performed in such a way that the ISDN-specific coded data incoming at an ISDN interface are converted by means of a code converter into binary-coded data separately for B- and D-channel information, b) the data of the B-channels are separated for B1- and B2-channel data, sections of equal length for the B1- and the B2-channel data are provided in a buffer device, and are then fed with a bit timing derived from the ISDN network timing with the B1- and B2-channel data alternating, to the receiver side in which process the data coming from the buffer device are checked for data identity and are compressed, c) blocks are formed from the incoming data of the D-channel and are fed to the transmission means to transmit them to the receiver side instead of the B-channel data preferably with the bit timing derived from the ISDN network timing, d) the ISDN-specific timings required for the communication of the transmitter and receiver are regained on the terminal side be means of a timing recovery device from the time sequence of the transmitted data bits, e) the received data are analysed, identified D-channel blocks are resolved and directly fed to a code converter, and identified B-channel data are decompressed and buffered separatedly for B1- and B2-channel data and are fed to the code converter in accordance with the regained timing, and the binary-coded data are converted into ISDN-specific data, f) on the terminal side, the data transmission is performed similarly to the process steps a) to c) with a timing of the process steps b) and c) equal to the timing regained in process step d), and g) on the network side, the received data are analysed, identified D-channel blocks are resolved and directly fed to a code converter, and identified B-channel data are decompressed and buffered separatedly for B1- and B2-channel data and are fed to the code converter in accordance with the ISDN network timing, and the binary-coded data are converted into ISDN-specific data.

The compression or decompression, respectively, of the B-channel data according to the process step b) is preferably performed such that during compression, identical characters are provided with a repetition counter and a flag, and during decompression character sequences marked that way are resolved.

Advantageously, in those periods of time in which no B1- and/or B2-channel is used for the transmission, no B-channel data are fed to the transmission means. If, for example, only one B-channel is active, only the B-channel data of the active B-channel are processed. Hence, the data rate required in the transmission means is reduced to the data rate of the active B-channel.

The natural variations of the required data rate for the transmission of the B- and D-channel information and the compression information are leveled out during data transmission by intermediately buffering the transmitted binary-coded data in a FIFO-structured buffer device of suitable depth on the terminal- or network side. By the process according to this invention, the bandwidth required for the data transmission can advantageously be reduced to the net data rate of the B-channels to be transmitted.

To carry out the compression the character repetitions occurring in the B1-channel and B2-channel data stream are utilized. If such character repetitions are identified, an accordingly labeled compression block is formed for the appropriate channel, which block contains an information about the number of the identical data within the output stream. A compression block is formed also in case the data stream would not be reduced by the compression. This block ensures the byte boundary synchronization of the B-channel data stream. Advantageously, on process step b) B-channel sections of fixed length are formed and transmitted with a minimum length of the D-channel blocks and B-channel compression blocks is one quarter of the B-channel sections and the D-channel blocks can have a multiple of the minimum length.

If D-channel blocks and B-channel compression blocks are formed, the transmission of the B-channel sections is interrupted, and instead of the B-channel sections these blocks are fed to the transmission means to be transmitted to the receiver side with the transmission of the D-channel blocks being preferred. Advantageously, the transmission of the B-channel sections is interrupted at a place divisible by 4.

The formed B-channel sections are transmitted to the receiver side having a timing derived from the ISDN network timing, by means of known transmission means via satellite or other transmission channels. This bit timing is regained on the terminal side from the bit transmission timing by means of a PLL circuit (phase locked loop) to be available for the ISDN interface.

On the receiver side, the received data are analysed, identified D-channel blocks are resolved, and the D-channel data are directly fed to the code converter. For the identified B-channel data the B-channel compression blocks are resolved, stored in the buffer device separately for B1- and B2-channel data, and fed to the code converter according to the timing regained, and the binary-coded data are converted into ISDN-specific coded data.

Both the terminal-side and net-side conversion of the ISDN-specific coded data into binary-coded data is performed by known methods with the help of a code converter, preferably an ISDN subscriber access controller.

If the transmission means uses several channels to carry out the transmission, segmenting and allocation may be done on the net and terminal sides according to the B-channels to be transmitted.

Advantageously, the process according to the invention may also be conducted such that in periods of time with the ISDN interface not being active, the transmission of serial digital data is carried out without code conversion. This is particularly possible if several channels are provided by the transmission means. Then the connections to, at least, one transmission channel are used as the interface for the exchange of the serial digital data, and the other transmission channels to transmit these data.

According to this invention, the process of the enlargement of the range of the transmission channel between functional groups of the ISDN-user interface is realized through an arrangement which comprises a facility for protocol conversion and a transmission channel on both the terminal and net sides.

The transmission channel comprises transmission equipment actually known and the means used for the transmission, for example a satellite channel with the appropriate transmission and receiving equipment and the modems required. The transmission channel may advantageously include several single channels. If the transmission channel includes several channels, the connections to, at least, one transmission channel can advantageously be used as the interface for the exchange of the serial digital data. Thus, the transmission of serial digital data is made possible through the other transmission channels in those periods of time in which the ISDN interface is not active.

The facilities for protocol conversion communicate with one another through the transmission channel. The facilities for protocol conversion are preferably structured identical, and can function in the master mode as well as in the slave mode with the protocol conversion facility connected netside functioning in master mode and the protocol conversion facility connected terminal-side functioning in slave mode, and vice versa.

The facilities for protocol conversion (PW) essentially comprise
an ISDN interface module (1),
a micro computer (6),
one or several interface modules (2) for the transmission channel X,
a timing generation module (3),
a mode switch (5),
a power supply (4),
as well as the appropriate electric connections and a bus for the address and data exchange. A bus connects the micro computer (6) to the ISDN interface module (1) and one or several interface modules (2) for the connection to the transmission channel (X).

The timing generation module (3) is connected to the interface module (1) and the interface modules (2) for the connection to the transmission channel (X) as well as to the micro computer (6), and is suitable to regain the ISDN-specific timings required for the communication between transmitter and receiver from the time sequence of the data bits transmitted.

The switch (5) for the mode selection (master/slave) acts on the power supply (4), the interface module (1) and the timing generation module (3). The mode switch (5) has an additional switching function to select the operational mode of protocol conversion through one or more interface modules (2) and to allocate the appropriate transmission timings for common operation.

The power supply (4) energizes the circuit and produces the supply voltage for mains-independent terminal equipment when the protocol converter works in slave mode.

The ISDN interface module (1) electrically converts the ISDN interface into a binary-coded form and vice versa. The binary data as well as necessary control information are exchanged between the interface module (1), the micro computer (6) and the interface modules (2) via the bus. The ISDN interface module (1) is composed of an ISDN interface and a circuit for the conversion of the ISDN-specific coded data into binary-coded data, for example an ISDN subscriber access controller (ISAC circuit). The interface modules (2) for the transmission on the X channel each consist of an interface and a serial input/output module SIO.

The micro computer (6) consists of a microprocessor, a ROM to store the program code, a RAM as the main memory, and a bus. Via the extended bus, the micro computer (6) is connected to the ISAC circuit in the interface module (1) and the serial input/output modules SIO in the interface modules (2). The processor of the micro computer (6) controls the function of the modules timing generation module (3), ISAC circuit in the interface modules (1) and SIO in the interface modules (2) in a known way by setting the corresponding registers provided in these modules.

The micro computer (6) is suitable to separate the incoming data of the B-channels for B1- and B2-channel data, to provide in its memory sections of identical lengths for B1- and B2-channel data, then to compress and exchange them with the interface modules (2) in connection with the timing generation module (3), as well as to take data received by the interface modules (2) and transfer them to the interface module (1).

On the net side, the equipment for protocol conversion operates in the master mode, as follows:

In the interface module (1) within the ISDN interface the signal levels of the ISDN interface are reciprocally converted into the signal levels required by the ISAC module.

Using the mode switch (5) the ISAC module in the interface module (1) is switched to the TE mode (terminal mode). In this mode, the ISAC circuit generates a timing signal of 512 kHz at the output DCL. When the ISDN interface is active, the timing signal of 512 kHz is derived synchronously from the bit timing of the ISDN interface. The 512 kHz timing signal of the ISAC circuit of the ISDN interface is used in the timing generation module (3) controlled by the processor in the micro computer (6) to generate corresponding to an additional switch position in the mode switch (5) the transmission timing for the interface modules (2).

The ISAC circuit in the interface module (1) converts the ternary-coded B- and D-channel signals from the ISDN interface into binary-coded signals (Bipolar-AM1) and stores them, byte by byte, in its registers. Conversely, the module converts the binary-coded B- and D-channel bytes entered by the processor in the micro computer (6) into ternary signals and transmits them to the interface of the interface module (1) to be transmitted on the ISDN interface.

The ISAC circuit signals, through a register, that it is prepared to accept one new B1- and B2-channel byte each and, simultaneously, one complete B1- and B2-channel byte each is ready to be accepted by the processor in the micro computer (6). The processor in the micro computer (6) periodically interrogates the signal register of the ISAC circuit and separates the B-channel bytes into B1- and B2-channel sections in its main memory.

The ISAC circuit signals, through another register, that D-channel data from the ISDN interface was received. The processor of the micro computer (6) periodically interrogates also this signal byte and forms D-channel blocks from the incoming D-channel data. When the processor in the micro computer (6) has received a D-channel block from the distant station, this block is resolved and given to the ISAC circuit to be transmitted to the ISDN interface.

From the B-channel data taken from the ISAC circuit the processor in the micro computer (6) forms sections and buffers them in its RAM. The micro computer selects an SIO according to the logical address and periodically interrogates the register of this SIO. The SIO indicates in its register when the next data portion is to be transmitted so that the data transmission will not be interrupted. The processor of the micro computer (6) correspondingly feeds further data portions to the addressed SIO in the interface module (2).

The processor successively delivers data portions of the ISDN interface to the SIO in the appropriate interface module (2). The ISDN interfaces operate synchronously on the base of the ISDN network timing so that also the data portions are synchronously transmitted in accordance with the transmission timing set in the mode switch (5) for the corresponding interface module (2).

Before the micro computer (6) delivers B-channel sections to the addressed SIO, the buffered B-channel data are analysed. The micro computer (6) forms compression blocks from compressible data, and transmits them instead of the B-channel sections. The relative address in the B-channel section is also provided in the compression block.

The micro computer (6) forms D-channel blocks from the existing D-channel data, and preferably transmits them to the addressed SIO instead of the B-channel sections the relative address also being transmitted in the B-channel section.

In reverse direction, the addressed SIO in the interface module (2) receives bit-serial data through the interface in the interface module (2). When the first data portion is received in the SIO, corresponding signaling bits are set in a register of the SIO. The processor of the micro computer (6) periodically interrogates this register and analyses the received data. B-channel data are, separatedly for B1- and B2-channel data, buffered in the RAM of the micro computer (6). Identified D-channel blocks are resolved and delivered to the D-channel register of the ISAC circuit in the interface module (1). Identified B-channel compression blocks are resolved and buffered in the RAM of the micro computer (6), and transmitted to the ISAC circuit in the interface module (1).

On the terminal side, the equipment for protocol conversion operates in the slave mode, as follows:

In the interface module (1) the reciprocal conversion of the signal levels of the ISDN interface into the signal levels required by the ISAC circuit is carried out in the interface.

Through the mode switch (5), the ISAC circuit in the interface module (1) is switched to the NT mode (network terminal mode). In this mode, the ISAC circuit requires synchronous timing signals at the inputs, of 512 kHz at DCL and of 8 kHz at FSC1 and FSC2. From these timing signals, the ISAC circuit derives the frame synchronization and bit synchronization timing signals for the ISDN interface.

The timing generation module (3) regains, from the bit timing of a selected interface module (2), the timing from which in the timing generation module (3), the timing signal of 512 kHz and therefrom, after division, a timing signal of 8 kHz is derived with a PLL operating to known principles. These timing signals are delivered to the corresponding inputs of the ISAC circuit in the interface module (1).

The micro computer (6), ISAC circuit in the interface module (1), and SIO in the interface module (2) operate together in a similar way as in the master unit in transmitting the B- and D-channel data between the ISDN interface and X-channel.

Advantageously, protocol conversion equipment may be constructed using one interface module (2) as well as several interface modules (2). The mode switch (5) then has an additional switching function for the selection of the operation mode of the protocol conversion with one or several interface modules (2) and the allocation of the appropriate transmission timing signals for common operation.

Using the process according to the invention and the apparatus according to the invention it is possible to transmit the varied ISDN services through the interface over long distances with a minimized bandwidth without having to convert the data into a different net. This enables one to remain in the used ISDN net whereby the quality of the transmission services is not affected.

If the transmission channel includes several channels, the connections to, at least, one transmission channel can advantageously be used as the interface for the exchange of the serial digital data. For that the terminal of an interface module (2) is switched as an interface for serial digital data and allows serial digital data to be exchanged through the other transmission channels in those periods of time in which the ISDN interface is not active.

The micro computer (6) identifies the state of the ISDN interface by analysing the D-channel information. With deactivated interface, the micro computer (6) takes data from the interface module (2), which is switched as an interface for serial digital data in this operational mode, and delivers them to the other interface module (2) for the transmission on the transmission channel X. If the ISDN interface is activated, the interface module (2), which is switched for the exchange of serial digital data, is switched off by the micro computer (6). The protocol conversion equipment then operates as described.

BRIEF DESCRIPTION OF THE DRAWINGS

Details of examples of embodiment of the invention ensue from the following description with reference to the drawings. The figures show.

DETAILED DESCRIPTION OF THE INVENTION

Figure 1:
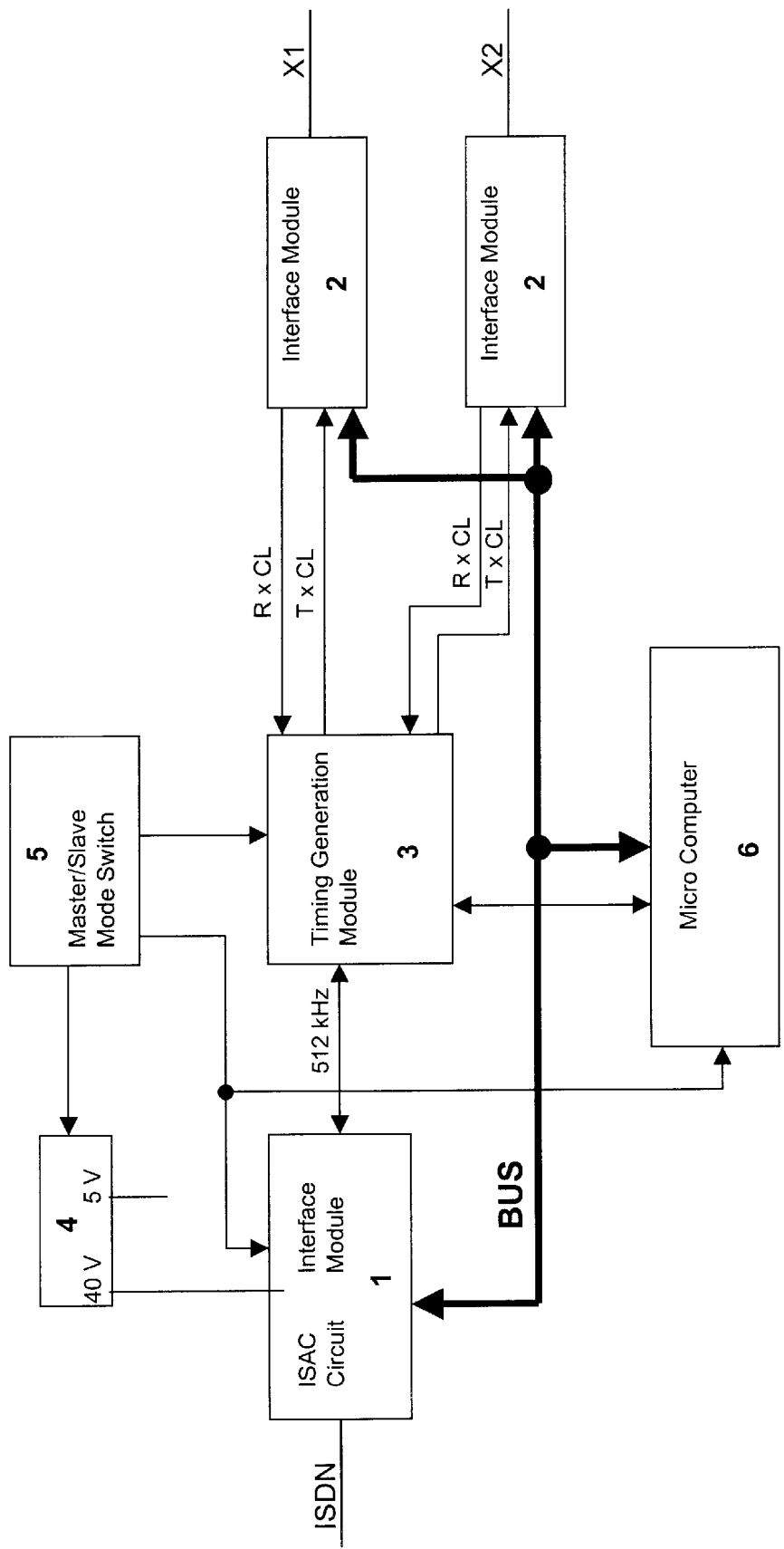
FIG. 1 a block diagram of an apparatus for protocol conversion

FIG. 1 shows, in block diagram representation, an apparatus for protocol conversion.

The micro computer (6) comprises a microprocessor realized as Am 188™ EM, a ROM for the storage of the program code, a RAM as the main memory, and a bus. Through its bus the microcomputer is connected to a SIO module designed as SAB 82532 in two interface modules (2) and to the ISAC circuit designed as PEB 2086 in the interface modules (1).

The processor in the micro computer (6) controls the function of the components PEB 2086 and SAB 82532 by setting the corresponding registers in these components. Also through registers of these components, the processor interrogates the state of these components and exchanges data.

The activation/deactivation of the ISDN interface is carried out by the PEB 2086 in the interface module (1). The state of the ISDN interface can be read from the registers of the PEB 2086. The processor in the micro computer (6) periodically interrogates the registers of the PEB 2086, which show the state of the ISDN interface. On the net side, the arrangement according to FIG. 1 operates in the master mode, as follows:

In the interface module (1), in the ISDN interface the signal levels are reciprocally converted from the ISDN interface into the signal levels required by the component PEB 2086.

With the mode switch (5) the component PEB 2086 is switched in the interface module (1) into the TE mode (terminal mode). In this mode, the PEB 2086 generates a timing signal of 512 kHz at the output DCL. When the ISDN interface is active, the timing signal of 512 kHz is synchronously derived from the bit timing signal of the ISDN interface. The timing signal of 512 kHz of the interface module is led to the timing generation module (3). The timing signal of 512 kHz from the PEB 2086 of the ISDN interface is, controlled by the processor, used in the timing generation module (3) to generate, by division, the given transmission timing signal of 64 kbit/s for the appropriate SIO.

The PEB 2086 in the interface module (1) converts the ternary-coded B- and D-channel signals from the ISDN interface into binary-coded signals and stores them, byte by byte, in its registers. Conversely, the component converts the binary-coded B- and D-channel bytes into ternary-coded signals and transmits these data to the interface of the interface module (1) for the transmission to the ISDN interface.

The PEB 2086 signals by means of a register that it is prepared to accept a new B1- and B2-channel byte each and, simultaneously, a complete B1- and B2-channel byte each is ready to be accepted by the processor. The processor of the micro computer (6) periodically interrogates the signal register of the and PEB 2086 and takes the finished B-channel bytes into its main memory or transmits the B-channel bytes, respectively.

The PEB 2086 signals by means of a further register that a D-channel frame from the ISDN interface has been received. The processor interrogates, also periodically, this signal byte, takes the D-channel data, if existing, into its main memory and forms channel blocks.

If the processor has received a D-channel block from the distant station, this block is resolved and fed to the PEB 2086 to be transmitted to the ISDN interface. The processor of the micro computer (6) forms B1- and B2-sections of a 32 bit length from the bytes accepted from the PEB 2086 and buffers them in the main memory RAM.

According to the logical address, the micro computer selects a SIO and periodically interrogates the register of this SIO. The SIO indicates in its register the time when the next data portion is to be transmitted in order not to interrupt the data transmission. The processor in the micro computer (6) correspondingly delivers further data portions to the addressed SIO in the interface module (2).

The processor consecutively delivers data portions of the ISDN interface to the SIO in the appropriate interface module (2). The ISDN interface operates synchronously on the base of the ISDN net timing signal so that also the data portions are synchronously transmitted according to the transmission timing of 64 kHz set for the appropriate interface module (2) by means of the mode switch (5).

Before the micro computer (6) delivers B-channel sections to the addressed SIO, the buffered B-channel data are analysed. From compressible data it forms compression blocks of a length of 8 byte, interrupts the delivery of B-channel sections to the addressed SIO and transmits them instead of the B-channel sections.

The relative address in the B-channel section is also provided in the compression block. In the same time, this block serves to carry out the byte synchronization.

From the D channel date existing, the micro computer (6) forms D-channel blocks of a length of 8 bytes or a multiple of it, and preferably transmits them to the addressed SIO instead of B-channel sections, the relative address also transmitting in the B-channel section. The transmission of the D-channel blocks additionally serves to carry out the byte synchronization.

In reverse direction, the addressed SIO in the interface module (2) receives bit-serial data through the interface in the interface module (2). When the first data portion is received in the SIO, corresponding signaling bits are set in a register of the SIO. The processor of the micro computer (6) periodically interrogates this register and analyzes the data received. B-channel data are buffered, separatedly for B1- and B2-channel data, in the RAM of the micro computer (6). Identified D-channel blocks are resolved and delivered to the D-channel register of the ISAC circuit in the interface module (1). Identified B-channel compression blocks are resolved and buffered in the RAM of the micro computer (6).

The B-channel sections are maintained on the transmission and reception side in a FIFO queue of a suitable depth to compensate for the increased demand of transmission rate which is caused by the occurrence of D-channel blocks.

On the terminal side, the arrangement according to FIG. 1 operates in the slave mode, as follows:

The conversion in either direction of the signal levels from the ISDN interface into the signal levels required by the PEB 2086 component occurs in the interface module (1) at the ISDN interface.

With the help of mode switch (5) the component PEB 2086 in the interface module (1) is switched into the NT mode (network terminal mode). In this mode, the PEB 2086 needs synchronous timing signals of 512 kHz at the inputs DCL, and of 8 kHz at FSC1 and FSC2. From these, the PEB 2086 derives the frame synchronization and the bit synchronization timing signals for the ISDN interface.

In the timing generation module (3), from the bit timing signal of a selected interface module (1), the timing signal is regained from which a timing signal of 512 kHz and therefrom, by division, a timing signal of 8 kHz are generated in the timing generation module (3) by means of PLL operating to known principles. These timing signals are delivered to the corresponding inputs of the ISAC circuit in the interface module (1).

The micro computer (6), ISAC circuit in the interface module (1), and SIO in the interface module (2) operate together in a similar way as in the master unit in transmitting the B- and D-channel data between the ISDN interface and X-channel. The arrangement according to FIG. 1 allows to transmit the varied services of the ISDN through the interface over long distances in a bandwidth of 64 kbit/s per B-channel without the need of conversion into a different net. This enables one to remain in the used ISDN net and the quality of the transmission services is not affected.

Figure 2:
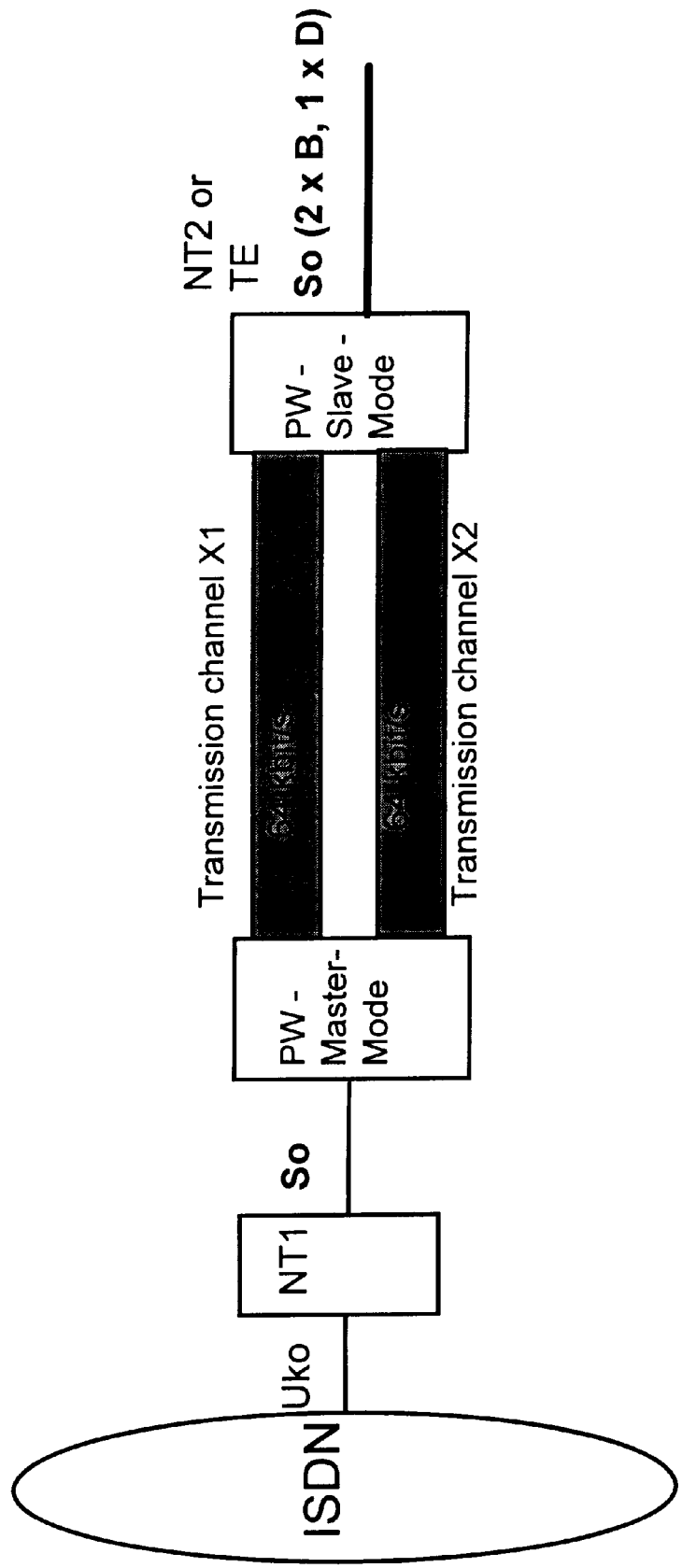
FIG. 2 the representation of an arrangement for the enlargement of the range of the transmission channel between functional groups of the ISDN user interface FIG. 3 the representation of an arrangement for the enlargement of the range of the transmission channel between functional groups of the ISDN user interface with protocl converter assigned to the corresponding transmission channel on the terminal side FIG. 4 the representation of an arrangement for the enlargement of the range of the transmission channel between functional groups of the ISDN user interface with interfaces for the exchange of serial digital data.

FIG. 2 represents an apparatus for the enlargement of the range of the transmission channel between functional groups of the ISDN user interface with reference to an $S_0$ interface.

Starting from an ISDN network through an interface $U_{ko}$ to a net termination NT1, a facility for protocol conversion PW is arranged on the net side at the interface $S_0$, which communicates through two transmission channels with a facility for protocol conversion PW on the terminal side, and which provides for the interface $S_0$ on the terminal side. On the terminal side, switching equipment (NT2) or, directly, terminal equipment (TE), for example, may be operated.

The equipment connected on the net side $S_0$ operates in the master mode, the equipment connected on the terminal side $S_0$ operates in the slave mode. The equipment operating in the master mode acts, with respect to the ISDN net, like a terminal equipment (TE), the equipment operating in the slave mode acts like a network termination (NT).

Between the two devices for protocol conversion (PW) which are connected through two transmission channels used in parallel, data exchange is done by bit-serial synchronous transmission of B-channel sections for B1 and B2 in a length of 32 byte. Equal output data are transmitted as compression block and D-channel data are transmitted as D-channel blocks. These blocks simultaneously serve to carry out the byte synchronization.

The device for protocol conversion (PW) in the master mode activates the $S_0$ interface whenever it is not active. It only transmits data when the $S_0$ interface is active.

The device for protocol conversion (PW) in the slave mode activates the $S_0$ interface whenever it is not active and the device, in the same time, receives data from the master device. It deactivates the $S_0$ interface when it does not receive data from the master device.

The apparatus according to FIG. 2 allows to transmit the varied services of the ISDN through the interface over long distances in a bandwidth of 64 kbit/s per B-channel without the need of the conversion into a different net. This enables one to remain in the used ISDN net and the quality of the transmission services is not affected.

Figure 3:
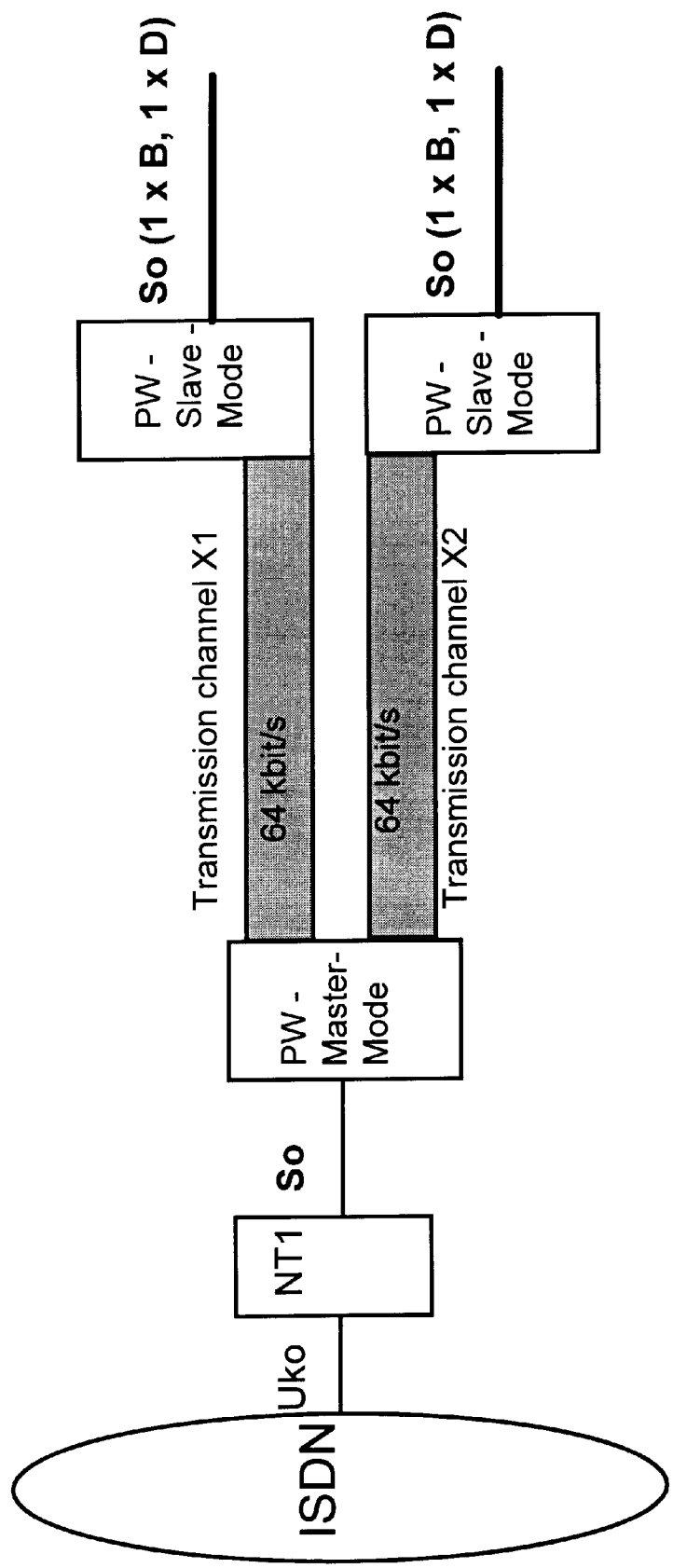

FIG. 3 shows, similar to FIG. 2, an arrangement for the enlargement of the range of the transmission channel between functional groups of the ISDN user interface with reference to an ISDN interface. Opposite to FIG. 2, on the terminal side one protocol converter each is allocated to each transmission channel. Thus it is possible to communicate separately for B1- and B2-channel over 64 kbit/s each at separate places.

Figure 4:
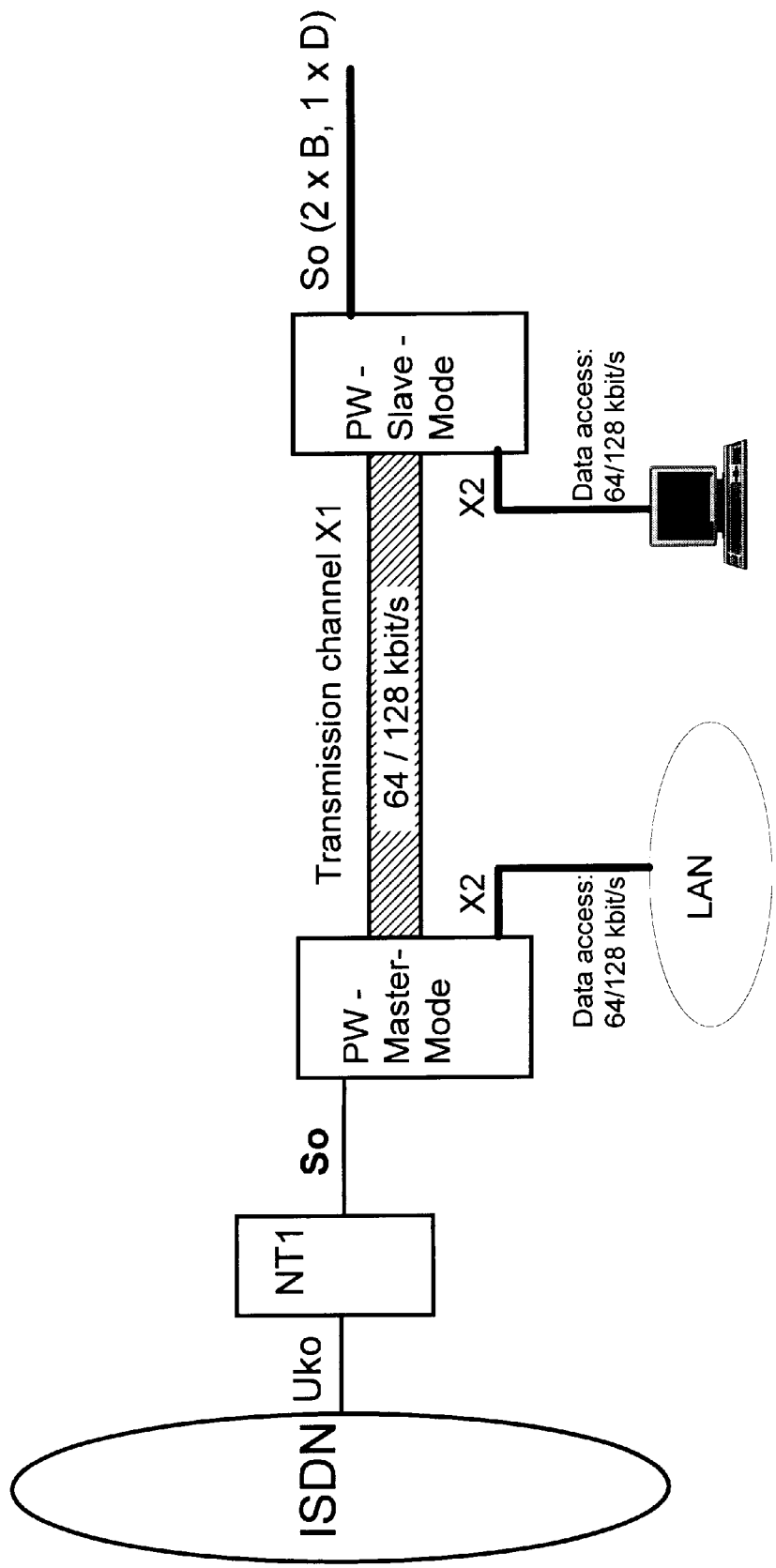

FIG. 4 shows, similar to FIG. 2, an arrangement for the enlargement of the range of the transmission channel between functional groups of the ISDN user interface with reference to an $S_0$ interface. Opposite to FIG. 2, the interface at the transmission channel X2 is used as a connection to a serial digital data source, for example an LAN or a PC. In those times, when the ISDN interface $S_0$ is not active, serial digital data can be exchanged through the transmission channel X1.

The micro computers (6) of the protocol converters (PW) identify, by analyzing the D-channel information, the state of the ISDN interface So. With the interface $S_0$ deactivated, the micro computer (6) takes data from the interface module (2), which is, in this operational mode, switched as interface for the exchange of serial digital data, and transmits them to the further interface module (2) to be transmitted on transmission channel X1. When the ISDN interface $S_0$ is activated, the micro computer (6) switches the interface module (2) off, which is switched the serve for the exchange of serial digital data. The device for protocol conversion then operates as described for FIG. 2.

Using the protocol converter described in FIG. 4, the switching function of a direct access to an ISDN network can be integrated in existing data connections.

What is claimed is:

1. A method for the enlargement of the range of the transmission channel between functional groups of the ISDN-user interface with a minimized bandwidth wherein:
   a) the data transmission is carried out on the network side such that the ISDN-specific coded data incoming at an ISDN interface are converted into binary-coded data by means of a code converter, separatedly for B- and D-channel information,
   b) the incoming data of the B-channels are separated for B1- and B2-channel data, sections of equal lengths for B1- and B2-channel data are prepared in a buffer device and subsequently fed to a transmission means in a step timing derived from the ISDN network timing alternating between B1- and B2-channel data and transmitted through this transmission means to a receiver side whereby the data arriving from the buffer device are checked for data equality and compressed, c) from the data of the D-channel, blocks are formed and, being preferred to B-channel data, are fed to the transmission means for the transmission to the receiver side in a step timing derived from the ISDN network timing, d) on a terminal side, by means of a timing regaining device, the ISDN-specific timing signals, which are necessary for the transmitter and receiver to communicate, are regained from the time sequence of the data bits transmitted, and e) the received data are analysed, identified D-channel blocks are resolved and directly fed to a code converter, and identified B-channel data are decompressed and, separately for B1- and B2-channel data, are buffered in a buffer device, and are fed to the code converter according to the regained timing, and the binary-coded data are line code converted into ISDN-specific data, f) on the terminal side, the transmission of the data is executed similar to the process steps a) to c) whereby the timing mentioned in the process steps b) and c) is that timing that is regained in step d), and g) on the network side, the received data are analysed, identified D-channel blocks are resolved and directly fed to the code converter, and identified B-channel data are decompressed and, separately for B1- and B2-channel data, are buffered in a buffer device and are fed with the ISDN network timing to the code converter, and the binary-coded data are line code converted into ISDN-specific data.

2. The method of claim 1, wherein the compression or decompression, respectively, of the B-channel data according to the process steps b) or e), respectively, is executed in such a manner that when identical characters occur, a B-channel compression block with a repetition counter and a flag for the appropriate channel is formed and during decompression identified character repetitions are resolved.

3. The method of claim 1, wherein B-channel sections of a fixed length are formed, the minimum length of D-channel blocks and B-channel compression blocks equals one quarter of the B-channel sections, and the D-channel blocks are a multiple of the minimum length.

4. The method of claim 3, wherein, as an aid for the byte boundary synchronization, a B-channel compression block is formed also when the data stream will not be reduced by this measure.

5. The method of claim 3, wherein in those time periods when the ISDN interface is not active, serial digital data are exchanged through the transmission means without line code conversion.

6. The method of claim 1, wherein when D-channel blocks and B-channel compression blocks are formed, the transmission of B-channel sections is interrupted at a place divisible by 4 and these blocks, instead of the B-channel sections, are transmitted to the transmission means for the transmission to the receiver side with the D-channel blocks being preferred.

7. The method of claim 1, wherein in those time periods when a B1- and/or B2-channel is not used for transmission, no B-channel data are fed to the transmission means.

8. An apparatus for the protocol conversion for the enlargement of the range of the transmission channel between functional groups of the ISDN-user interface, essentially comprising a ISDN-interface module (1), a micro computer (6), one or several interface modules (2) for the transmission channel X, a timing generation module (3), a mode switch (5), a power supply (4) and appropriate electrical connections and a bus for the address and data exchange with the interface module (1) being suitable to convert both ISDN-specific line coded data into binary-coded line data and, in the reverse direction, binary-coded line data into ISDN-specific line coded data, in which the micro computer (6) is connected, via the bus, to the ISDN-interface module (1) and the interface modules (2) for the connection to the transmission channel X and is suitable the make available in its memory sections of equal length for B1- and B2-channel data, subsequently to compress them and in connection with the timing generation module (3), to exchange them with the interface module (2), and is suitable to take data received from the interface module (2) and to deliver them to the interface module (1) with the mode switch (master/slave) (5) acting on the power supply (4), the interface module (1) and the timing generation module (3) and having an additional switching function for the operation for protocol conversion through one or several interface modules (2) and the allocation of the corresponding transmission timings, in which the power supply (4) energizes the circuit, and with the protocol converter operating in slave mode, delivers the supply voltage for mains-independent terminal equipment, and where the timing generation module (3) is connected to the interface modules (1), the interface module (2) for the connection to the transmission channel (X), and the micro computer (6) and is suitable to regain the ISDN-specific timing signals necessary for the communication of transmitter and receiver from the time sequence of the data bits transmitted.

9. An apparatus for protocol conversion according to claim 8, wherein a first interface module (2) is provided as an interface for the exchange of serial digital data and a second interface module (2) is provided as an interface to the transmission channel X.

10. An apparatus according to claim 8, wherein the transmission channel X is constructed of one channel or several channels.

11. An apparatus according to claim 10, wherein the transmission channel X is constructed of several channels and the apparatus for protocol conversion comprises several interface modules (2), wherein the connections to, at least, one interface module (2) are switched as an interface for the exchange of serial digital data and in those time periods in which the ISDN interface is not active, the transmission of serial digital data over the respectively connected transmission channel is allowed.

* * * * *